(12) United States Patent
Guilbard

(10) Patent No.: US 6,293,365 B1
(45) Date of Patent: Sep. 25, 2001

(54) MECHANICAL LINKAGE DEVICE WITH SELF-REGULATING STABILIZER SUITABLE FOR ANY ROTATING ELEMENT

(76) Inventor: Paul Guilbard, Jaunay-Clan (FR)

( * ) Notice: Subject to any disclaimer, the term of this patent is extended or adjusted under 35 U.S.C. 154(b) by 0 days.

(21) Appl. No.: 08/776,667
(22) PCT Filed: Jul. 27, 1995
(86) PCT No.: PCT/FR95/01017
§ 371 Date: Jan. 31, 1997
§ 102(e) Date: Jan. 31, 1997
(87) PCT Pub. No.: WO96/04148
PCT Pub. Date: Feb. 15, 1996

(30) Foreign Application Priority Data

Aug. 1, 1994 (FR) .................................................. 94 09731

(51) Int. Cl.[7] .................................................. B60K 17/24
(52) U.S. Cl. .................. 180/379; 180/376; 384/550; 74/307
(58) Field of Search .................. 180/379, 380, 180/376, 76; 384/550; 74/307

(56) References Cited

U.S. PATENT DOCUMENTS

| | | | | |
|---|---|---|---|---|
| 141,129 | * | 7/1873 | Eccles | 384/550 |
| 568,898 | * | 10/1896 | Gilliland | 384/550 |
| 1,222,534 | * | 4/1917 | Cormier | 384/550 |
| 1,416,341 | * | 5/1922 | Dobbins | 384/550 |
| 3,261,234 | * | 7/1966 | Broschard et al. | 384/550 |
| 4,484,484 | * | 11/1984 | Wissink et al. | 74/41 |
| 5,103,690 | | 4/1992 | MacPherson et al. | 74/665 |
| 5,353,889 | * | 10/1994 | Hamada | 180/242 |

FOREIGN PATENT DOCUMENTS

| | | |
|---|---|---|
| 33 30 549 | 3/1985 | (DE) . |
| 35 45 545 | 12/1986 | (DE) . |
| 0 308 312 | 3/1989 | (EP) . |
| 2 322 757 | 4/1977 | (FR) . |
| 2 148 416 | 3/1985 | (GB) . |

* cited by examiner

Primary Examiner—Christopher P. Ellis
(74) Attorney, Agent, or Firm—Young & Thompson

(57) ABSTRACT

Mechanical linkage device with self-regulating stabilizer suitable for any rotating element. The device enables a rotary element (38) to be movingly connected to the support (12) on which it is rotatingly mounted. The device is characterized by comprising at least one ring gear (48) integral with the support, and at least one pinion (46), which is freely and rotatingly mounted about a shaft integral with the rotary element. The pinion is designed to mesh with the ring gear. The device is suitable for motor vehicles.

4 Claims, 2 Drawing Sheets

MECHANICAL LINKAGE DEVICE WITH SELF-REGULATING STABILIZER SUITABLE FOR ANY ROTATING ELEMENT

FIELD OF THE INVENTION

The present invention has for its object a device for mechanical linkage suitable for any rotating element. It offers the possibility of associating the couple of a movement with its bearing as soon as it enters into action, to control more precisely its rotation and to increase its output.

Until then, the circulating couple poses a problem of reaction on more or less long transitions because of the fact that it requires a point of application to manifest itself.

This device aims precisely to stabilize the couple at a predetermined place. It permits both fulfilling the function of balancing and of controlling the reactions in a more or less efficacious manner as a function of its design, of its dimensions and of its location.

BACKGROUND OF THE INVENTION

It is known that the rotation of a rotating element relative to a support is rendered possible by means which suppress friction, which is the case for roller bearings or for self-lubricated rings or for rings in an oil bath.

Considering the case of a shaft maintained by two bearings secured to a frame and driven in rotation, it will be seen that there is no connection of the movement between the chassis and the shaft if there is no guidance by the bearings whose object is to maintain the shaft in place.

During its rotation, whether during acceleration, deceleration or constant speed of rotation, the shaft is independent of the frame.

It is known moreover that rotating shafts are subject to flexure which is more or less great to the extent the bearings are spaced, that the shift has a small diameter relative to its extent, that the shaft has a large balancing fault.

This leads particularly to premature wear of the bearings, to vibrations damaging to the connection members to be driven.

In a very simplified vehicle comprising a chassis mounted on four independent wheels and provided with independent propulsion means for the wheels, it is known that as soon as one of the wheels encounters different adherence conditions, this wheel will give rise to at reaction on the chassis.

Thus during its movement, when the vehicle has a wheel bearing on sand for example and the other on macadam, this vehicle has the tendency to lose its stability because the wheel on the sand will have its speed of rotation slowed relative to the other wheels and particularly relative to the wheel situated in the same path.

It is known that the wheels are independent in rotation of each other and particularly that they are not connected to the speed of movement of the chassis relative to the ground on which the vehicle moves.

Thus, one wheel can turn faster than the speed of movement of the chassis relative to the ground, which causes slippage, or slower, which causes blockage.

In the two cases, there is a loss of adherence of the wheel in contact with the ground, with control difficulties that that leads to.

If the vehicle comprises drive means of at least one train of wheels, the problem which arises is the same, but it is masked by other difficulties.

Thus, generally, any vehicle which has a driven wheel train has a differential interposed between the driven wheels such that the vehicle can follow the turning curve in a more progressive manner.

The differential has a very precise role which is that of compensating the difference of rotative speed of the inside wheel with respect to the outside wheel.

It should be noted that the drive shaft drives a large ring gear secured in rotation to a differential housing in which is locked a cross piece receiving satellites mounted freely in rotation which coact with planets secured to the internal end of each of the wheel shafts, themselves mounted freely in rotation thanks to roller bearings.

The outer end of each of the shafts is also mounted freely in rotation relative to the chassis thanks to bearings.

Each free end of the shaft carries one of the motor-driven wheels.

It is also known that the motor-driven wheels are not connected to the chassis during their rotation.

The differential has the role of amplifier-compensator but does not permit any precise connection of the rotative movement of the wheels with the speed of movement of the vehicle relative to the ground.

This absence of connection is responsible for loss of safety of vehicles, as shown in the following example.

An automotive vehicle with two motor-driven wheels and two idling wheels moves over a street paved in macadam.

When the vehicle follows a curve, the differential absorbs the difference of speed of the inner wheel relative to the outer wheel because the planets can displace angularly one relative to the other, by rotation of the satellites.

The couple also presents a different distribution on the two wheels because one adheres better than the other to the macadam.

This spacing of the distribution of the couple is even more flagrant when the vehicle moves over a macadam in a straight line, and the wheels on the same side encountered a sheet of ice for example which therefore modifies the adherence of these wheels.

The couple is distributed in a very unsymmetric way essentially on the motor-driven wheel which has the least adherence.

This wheel skids, which is to say that the speed of rotation of the wheel is greater than the theoretical speed that this wheel should have as a function of the speed of movement of the vehicle relative to the ground, given its development.

As soon as the vehicle wheels rolling on the snow return to the macadam, the coefficient of adherence increases abruptly and there may be a very brief skidding, but in any case the vehicle is unbalanced.

The greater the speed and weight of the vehicle during loss of adherence, the greater the danger.

SUMMARY OF THE INVENTION

The object of the invention is to provide a device for connecting in movement a rotating element with the support on which it is rotatably mounted, which is characterized in that it comprises at least one ring gear, secured to the support and at least one pinion, mounted freely in rotation about an axle secured to the rotating element, provided to coact with the ring gear by engagement.

More particularly, the device comprises three pinions mounted freely in rotation each about an axle secured to the rotating element and spaced 120° apart from each other.

According to one particular application of the device to a vehicle provided with wheels mounted freely in rotation relative to the chassis of this vehicle, there is provided for each of the wheels, motor driven or not, an assembly of ring gear/pinions of standard design, the ring gear being mounted fixedly relative to the chassis and the pinion or pinions being mounted freely in rotation on an axle or axles secured to the corresponding wheel shaft.

Preferably, the ring gear and the pinion or pinions are disposed immediately adjacent to the wheel carried by the shaft.

More particularly, the ring gear and the pinion or pinions are disposed in line with the wheel hub.

According to another use of the device, this time to a transmission shaft mounted on bearings secured to a frame, the ring gear is secured to the frame and the pinion or pinions are mounted rotatably on axles secured to this shaft and the ring gear and the pinion or pinions are disposed immediately adjacent the bearings.

One embodiment provides to arrange the assembly of the ring gear and the pinions or pinions in a sealed casing containing a lubricant.

BRIEF DESCRIPTION OF THE DRAWINGS

The device will now be described with respect to the accompanying drawings, in which.

DESCRIPTION OF THE PREFERRED EMBODIMENTS

Figure 1:
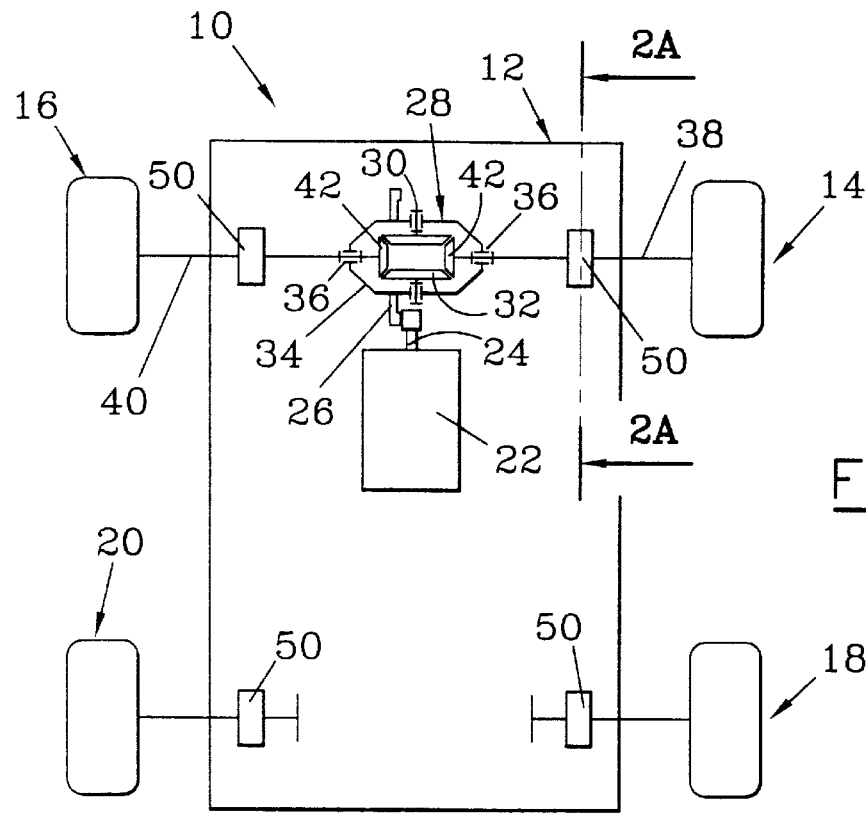
FIG. 1 is a schematic view of a four-wheel vehicle of which two wheels are motor driven, with a differential, provided with the device according to the invention.

In FIG. 1, there is shown a vehicle 10 comprising a chassis 12, two front right 14 and left 16 motor-driven wheels, two rear free wheels, right 18 and left 20.

The vehicle motor is shown at 22 and its drive shaft at 24.

This drive shaft 24 drives in turn a ring gear 26 of a differential 28.

The differential comprises in a known manner a cross piece carrying satellites 32, secured in rotation to a housing 34, itself mounted for rotation by roller bearings 36 on two shafts 38 and 40 of the wheels 14 and 16.

The satellites 32 coact with planet gears 42 carried by the ends of the wheel shafts.

Figure 2A:
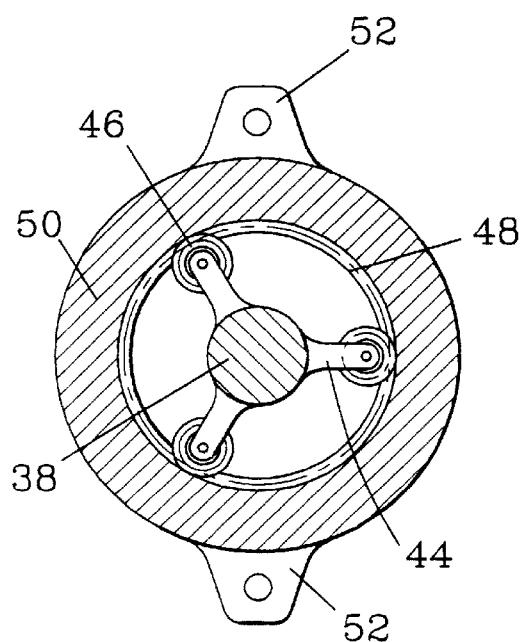
FIG. 2A is a transverse cross-sectional view of a detail of an embodiment of the linking device according to the invention.
Figure 2B:
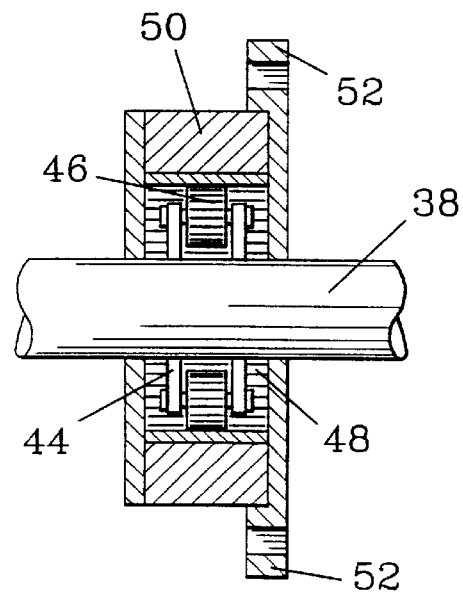
FIG. 2B is a longitudinal cross-sectional view of the device according to the invention.

The linking device according to the invention thus comprises as is shown in FIG. 2A forks 44 secured to the wheel shaft 38 between which are mounted freely in rotation pinions 46.

the device moreover comprises a crown gear 48 secured in a sealed frame 50 fixed by tongues 52 to the chassis 12 by means of suspension arms.

Figure 3:
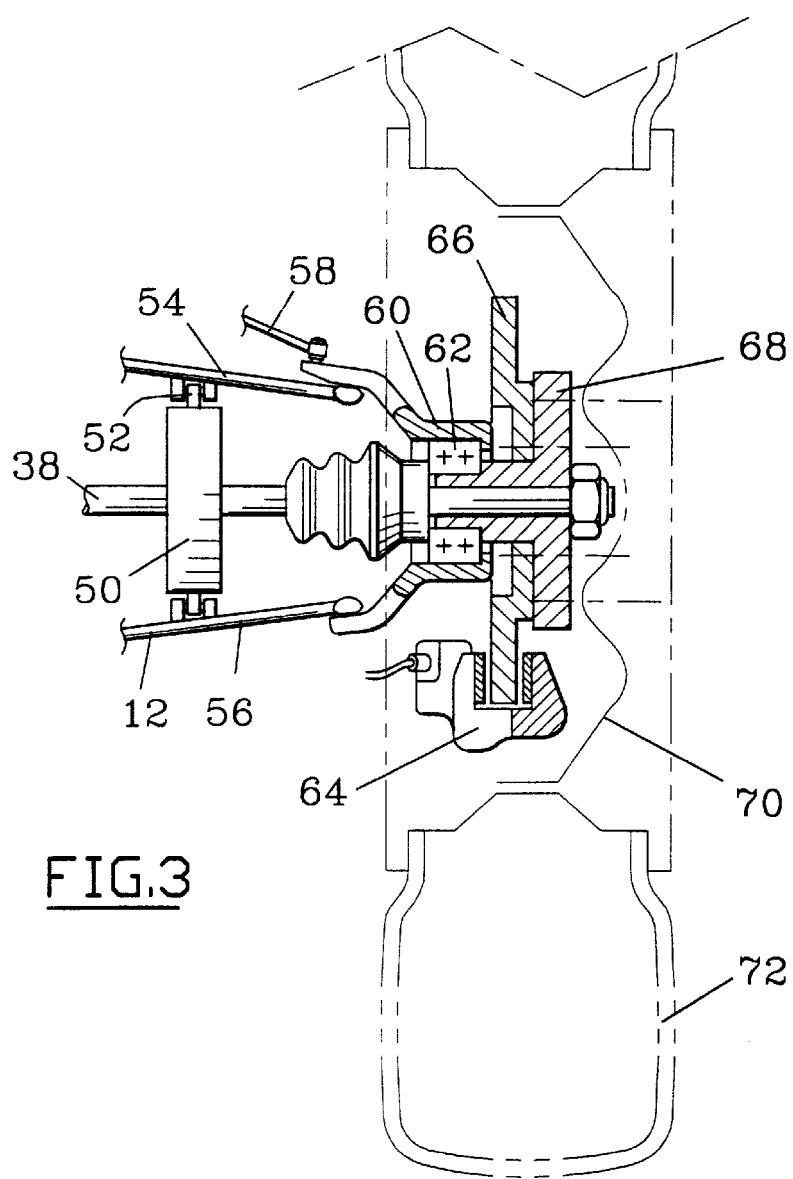
FIG. 3 is a detailed view of the device mounted on a wheel shaft.

In FIG. 3, there is shown the upper suspension arm 54 and lower suspension arm 56, the directional controls 58, the fuse-carrying block 60, the roller bearing 62 in which the shaft 38 turns, the brake stirrup 64, the brake disc 66, the plate and securement 68 of the wheel rim 70 supporting the tire 72.

The casing 50 is secured to the fuse-carrying block 60, about the wheel shaft and as close as possible to the wheel.

The operation of the device according to the invention will now be described in detail with reference to these figures.

When a vehicle is not equipped with the device according to the invention, as soon as the vehicle moves on a roadway covered with macadam, the motor 22 transmits the couple generated to the differential which distributes it evenly between the motor-driven wheels 14 and 16.

Thus the ring gear 26 is driven in rotation, and drives the casing 34, the cross piece 30, the satellites 32 and the planets 42 secured to the shafts 38 and 40 of the wheels.

The rear wheels 18 and 20 are free wheeling.

If the right wheels 14 and 18 roll on a less adherent surface, for example macadam covered with snow, the front wheel 14 skids, the more the vehicle is accelerating whilst the wheel 18 stabilizes.

Thus, the couple is derived from the differential toward the wheel which has the lowest adherence.

The wheel 16 which adheres, offers a resistive force which maintains the planet 42 of the shaft 40 corresponding to a constant speed which is the theoretical speed at which it must turn as a function of the speed of the vehicle and of the development of the tire of the wheel.

By contrast, the planet 42 of the other shaft 38, because it has no adherence, can turn more rapidly, the differential compensating the difference of speed of rotation of the shafts by rotation of the satellites 32 themselves.

It is at this point that the device of the invention intervenes.

Thus, the wheel 14 which must be placed in over-speed of rotation is maintained at a constant speed which avoids skidding.

The shaft 38 of the wheel which drives in rotation the pinions 46 is regulated in rotation because the pinions coact with the large ring gear by engagement, which leads to a regulatory reaction different from that of the single rolling.

The same is true for the rear wheel 18 which is regulated in rotation.

It will be noted on the other hand that when the vehicle moves and follows a curve, the differential absorbs the speed difference as is normally the case without disturbance by the device of the invention.

The couple is thus self-adjusted by the devices of the invention of the same design disposed on all the wheels.

Thus, the couple is better distributed because the engagement of the pinions with the large ring gear leads to a resisting effect which controls upon augmentation of the decrease of the couple.

It will be seen that the wheels are caused to move in rotation at the exact speed at which they must move as a function of the speed of the vehicle relative to the ground, given the development of the tire.

The linear speed developed by the wheel is continuously equal to the speed of movement of the vehicle relative to the ground.

There can thus be no skidding.

The adherence is always maximal for a given couple adjacent the wheel and the ground.

The description which has been given applies to when the vehicle is accelerating or at least applying tractional force.

The same phenomenon with the device according to the invention takes place during deceleration.

The wheels slow down uniformly as a function of the speed of the vehicle when the driver actuates the brake pedal.

By contrast, if the braking force is too intense, the wheels will lock but altogether.

The device behaves as if the wheels were connected in their movement in rotation to a same reference which is the chassis of the vehicle, itself moving.

Because of this, the weight of the moving vehicle plays an important role on the braking possibilities. The braking must be more progressive, more precise, more effective and above all balanced.

It will also be noted that the nearer the device is placed to the wheel, the better is the effect obtained because the couple is stabilized near its point of use.

Figure 4:
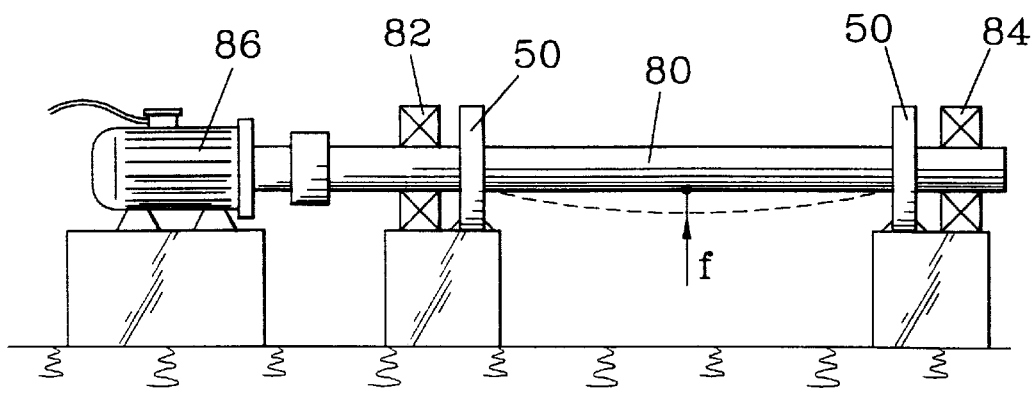
FIG. 4 is a view of a use of the device according to the invention for a rotating wheel.

Another use of this regulatory effect relates to motor or linking drive shafts to transfer the couple to a spaced member, as is shown in FIG. 4.

A shaft 80 being mounted for rotation between two bearings 82, 84 rotates freely, driven by a motor 86.

There is seen as soon as rotation begins that there is a deflection shown by arrow f, between the bearings, which is due to bad balancing of this shaft.

This is more noticeable the worse the shaft is balanced or when the speed increases. Such a deflection thus increases a function of the disproportion of the shaft diameters relative to the couples transmitted.

It suffices to place at least one rotative linking device 50 according to the invention between the shaft and the frame which supports the bearings to reduce very substantially the deflection of this shaft. The control of the effect of the centrifugal force becomes easier. It can improve as a function of the members used according to the size of the latter.

The result is more accentuated the nearer the device is placed to a bearing.

In this type of arrangement, to ensure more intense working, there can be added a central pinion having only the purpose of interconnecting the other pinions.

This pinion bears on the shaft by a bearing free to move in translation by means of a lubricated journal bearing for example, so as to synchronize all the pinions together.

The shape of the pinions can be straight or conical.

Similarly, the number of axles per vehicle is not limited, the system being adapted for driven axles as well as idle axles.

Moreover, the invention provides positioning the assembly of pinions and ring gears in a sealed casing forming a housing, but as a modification, these latter could be associated with existing mechanical assemblies such as axle mountings, hubs, transmissions, so as to facilitate maintenance and decrease size.

Because of this, in the principal embodiment, the device is placed near the wheels to improve adherence and the distribution of the loads but this arrangement is not limiting.

Of course, on a multi-axle vehicle, only one of the axles need be provided, with all the advantages that flow therefrom, with the device according to the invention.

What is claimed is:

1. A vehicle comprising a chassis and wheels mounted freely in rotation relative to the chassis on respective wheel shafts, each wheel being directly fixed to one of said respective wheel shafts, and being operatively associated with a device for movably linking one of said respective wheel shafts to the chassis; each device being secured to the chassis and comprising:

at least one ring gear;

means for fixedly mounting the ring gear relative to the chassis;

at least one pinion mounted freely in rotation about an axle secured to at least one of said wheel shafts traversing said device, said pinion being structured and arranged to mesh with the ring gear; and each of said wheel shafts having an input and an opposite output end structured and arranged to rotate at the same speed.

2. The vehicle according to claim 1, wherein one of said device is disposed immediately adjacent to one of said respective wheel shafts.

3. The vehicle according to claim 2, wherein one of said device is disposed in line with a corresponding wheel hub.

4. The vehicle according to claim 1, wherein the ring gear and the pinion are disposed in a sealed housing containing lubricant.

* * * * *